United States Patent [19]

Grundy et al.

[11] 3,909,739

[45] Sept. 30, 1975

[54] RADIATION HARDENED SENSE AMPLIFIER FOR THIN FILM MEMORY APPLICATIONS

[75] Inventors: Gary L. Grundy, Rosemount; David C. Steiner, Minneapolis; Gerard C. Gutzmann, West St. Paul; Ralph G. Krueger, St. Paul, all of Minn.

[73] Assignee: The United States of America as represented by the Secretary of the Air Force, Washington, D.C.

[22] Filed: May 27, 1969

[21] Appl. No.: 828,394

[52] U.S. Cl. .................... 330/33; 307/315; 307/308

[51] Int. Cl. .......................... H03f 3/08; H03k 17/60

[58] Field of Search ........ 307/308, 315, 298; 330/33

[56] References Cited

UNITED STATES PATENTS

| | | | |
|---|---|---|---|
| 3,505,534 | 4/1970 | Bowar et al. | 307/315 X |
| 3,524,999 | 8/1970 | Fletcher et al. | 307/308 |

*Primary Examiner*—Malcolm F. Hubler
*Attorney, Agent, or Firm*—Joseph E. Rusz; George Fine

[57] ABSTRACT

An apparatus for a radiation hardened sense amplifier for operation in a radiation environment having a plurality of amplifier stages of the Darlington pair type utilizing transformer coupling. The first stage includes a common mode choke to provide a photo-current cancelling function while the Darlington pair in each amplifier stage provides a gain stabilization function.

5 Claims, 7 Drawing Figures

INVENTORS
GARY L. GRUNDY
DAVID C. STEINER
GERARD C. GUTZMANN
RALPH G. KRUEGER
BY
Harry A. Herbert Jr. and
George Fine
ATTORNEYS

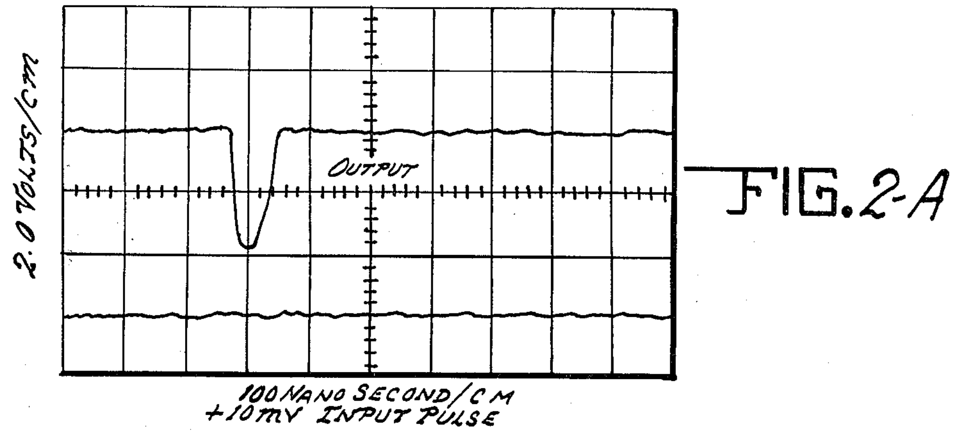
FIG. 2-A
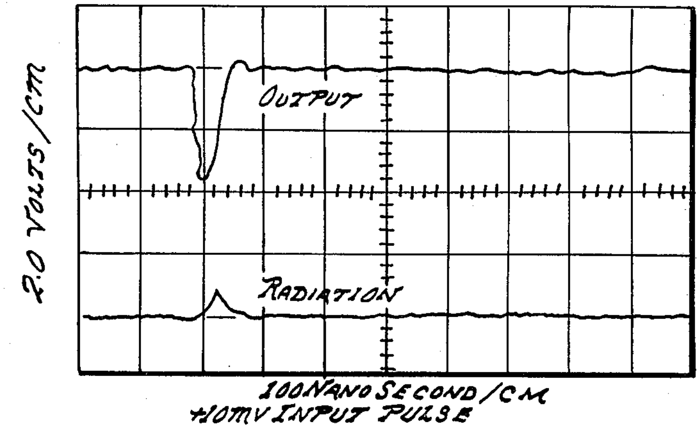
FIG. 2-B
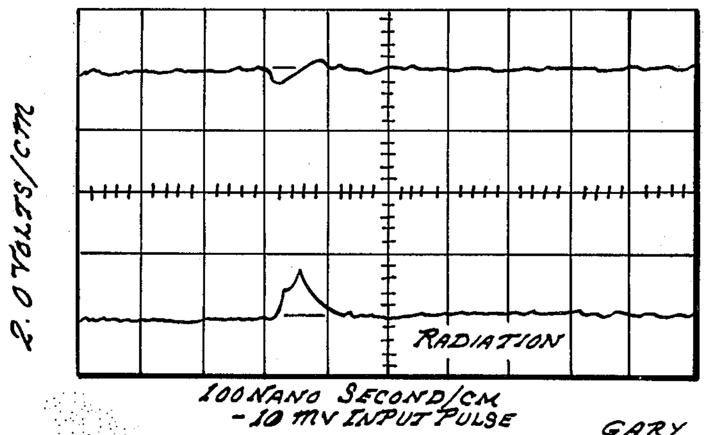
FIG. 2-C
INVENTORS
GARY L. GRUNDY
DAVID C. STEINER
GERARD C. GUTZMANN
RALPH G. KRUEGER
BY Harry A. Herbert Jr. and George Fine
ATTORNEYS

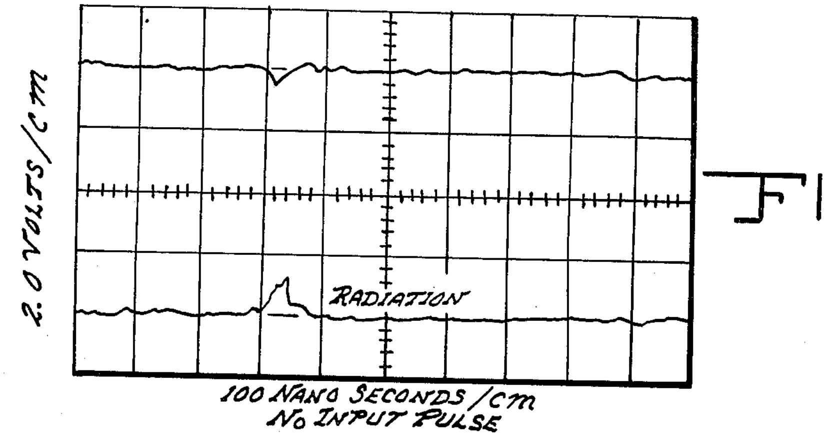
FIG. 2-D
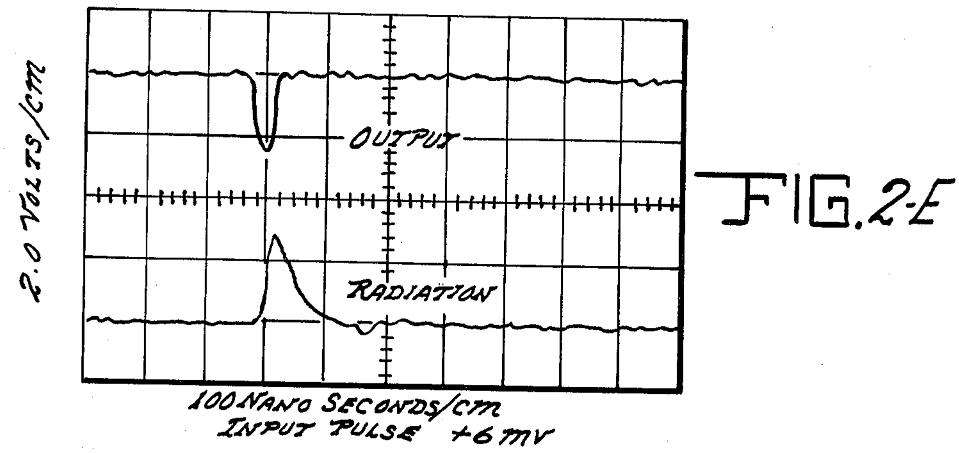
FIG. 2-E
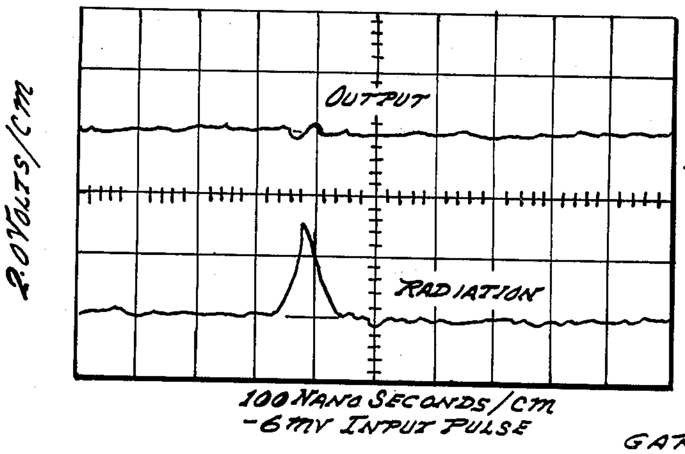
FIG. 2-F
INVENTORS
GARY L. GRUNDY
DAVID C. STEINER
BY GERARD C. GUTZMANN
RALPH G. KRUEGER
Harry A. Herbert Jr. and
George Fine
ATTORNEYS

RADIATION HARDENED SENSE AMPLIFIER FOR THIN FILM MEMORY APPLICATIONS

BACKGROUND OF THE INVENTION

Computer equipment is finding increasing use in environments which are subject to nuclear radiation. In airborne computer equipment, the requirement for low power, high density, small size and light weight almost always dictates a thin film memory element with relatively small signal as compared to cores. An aerospace guidance computer with a thin film memory capable of surviving in the nuclear environment has stringent requirements placed on all the elements of memory electronics. The most difficult problem is the sense amplifier because of the magnitude of the information signals which are to be dealt with. Therefore the problem in the sense amplifier is most acute. The sense amplifier is one of the most sensitive circuits in airborne or spaceborne computer equipment and will be adversely affected in a radiation environment.

A sense amplifier which will be in operation in a radiation environment must be designed to take into account the effects of radiation on semiconductor operation and utilizes design techniques which will insure undistorted amplification of the film memory element output. Another problem area is circuit timing which becomes most critical during operation in a radiation environment.

Two of the major effects on solid state circuits which result from operation in a radiation environment are the transient perturbations in the circuit and the permanent damage to the semiconductor components. The transient perturbations or responses within the circuit are the result of gamma radiation while the permanent damage to the semiconductor devices is the result of neutron radiation. The transient responses which are produced by gamma radiation are in the form of photo currents which result from carrier liberation in the semiconductor lattice structure. If the transistor is drawing normal circuit operating power, the transistor will amplify part of the primary photocurrent giving rise to secondary photocurrent. If a sufficiently large amount of gamma energy is absorbed, the semiconductor may be subjected to destructive overheating.

The permanent damage which is caused by neutron bombardment of the lattice structure results in gain degradation of the transistor. If the energy which is transferred to the atom by the colliding neutron is greater than the energy which binds the atom to the crystal lattice, the atom will escape the lattice. Therefore, the neutron bombardment has the effect of changing the doping of the semiconductor material which, in turn, alters the gain of the device. Although small changes in collector-to-emitter voltage, collector-saturation-voltage and cutoff-collector current also result from neutron bombardment, these effects are usually insignificant. It will, therefore, be evident that the major problems which have to be overcome in designing computer equipment for operation in a radiation environment are the transient effects of photocurrents which are produced by gamma radiation and the gain degradation and decreased storage which is caused by neutron bombardment.

SUMMARY OF THE INVENTION

The present invention provides a radiation hardened sense amplifier for thin film memory applications utilizing three A.C. transformer coupled differential amplifier stages. The A.C. transformers provide cancellation of the radiation-induced photocurrents and the stage-to-stage impedance matching. Transformers are not vulnerable to radiation and are used in place of vulnerable semiconductors to A.C. couple the differential stages. In the first stage of the sense amplifier, the Darlington pair, in combination therewith the common mode choke, stabilizes the amplifier gain in a neutron environment by utilizing a large amount of feedback and thus substantially increases the signal-to-noise ratio.

It is one object of the invention, therefore, to provide an improved radiation hardened sense amplifier for cancelling radiation induced photocurrents.

It is another object of the invention to provide an improved radiation hardened sense amplifier having high signal-to-noise ratio during operation in radiation environments.

It is yet another object of the invention to provide a radiation hardened sense amplifier apparatus for maintaining a stabilized amplifier gain while in operation in a neutron environment.

It is still another object of the invention to provide a sense amplifier apparatus employing transformers which are not vulnerable to radiation in place of radiation vulnerable semiconductors.

These and other advantages, features and objects of the invention will become more apparent from the following description taken in connection with the illustrative embodiments in the accompanying drawings.

BRIEF DESCRIPTION OF THE DRAWINGS

FIG. 2A is the waveform representation of the output signal for $a+10$ millivolt input signal;

FIG. 2B is the waveform representation of the output signal for $a+10$ millivolt input signal under a simulated radiation environment;

FIG. 2C is the waveform representation of the output signal for $a-10$ millivolt input signal under a simulated radiation environment;

FIG. 2D is the waveform representation of the output signal for no input signal under a simulated radiation environment;

FIG. 2E is the waveform representation of the output signal for a+6 millivolt input signal under a simulated radiation environment; and FIG. 2F is the waveform representation of the output signal for a−6 millivolt input signal under a simulated radiation environment.

DESCRIPTION OF THE PREFERRED EMBODIMENT

Figure 1:
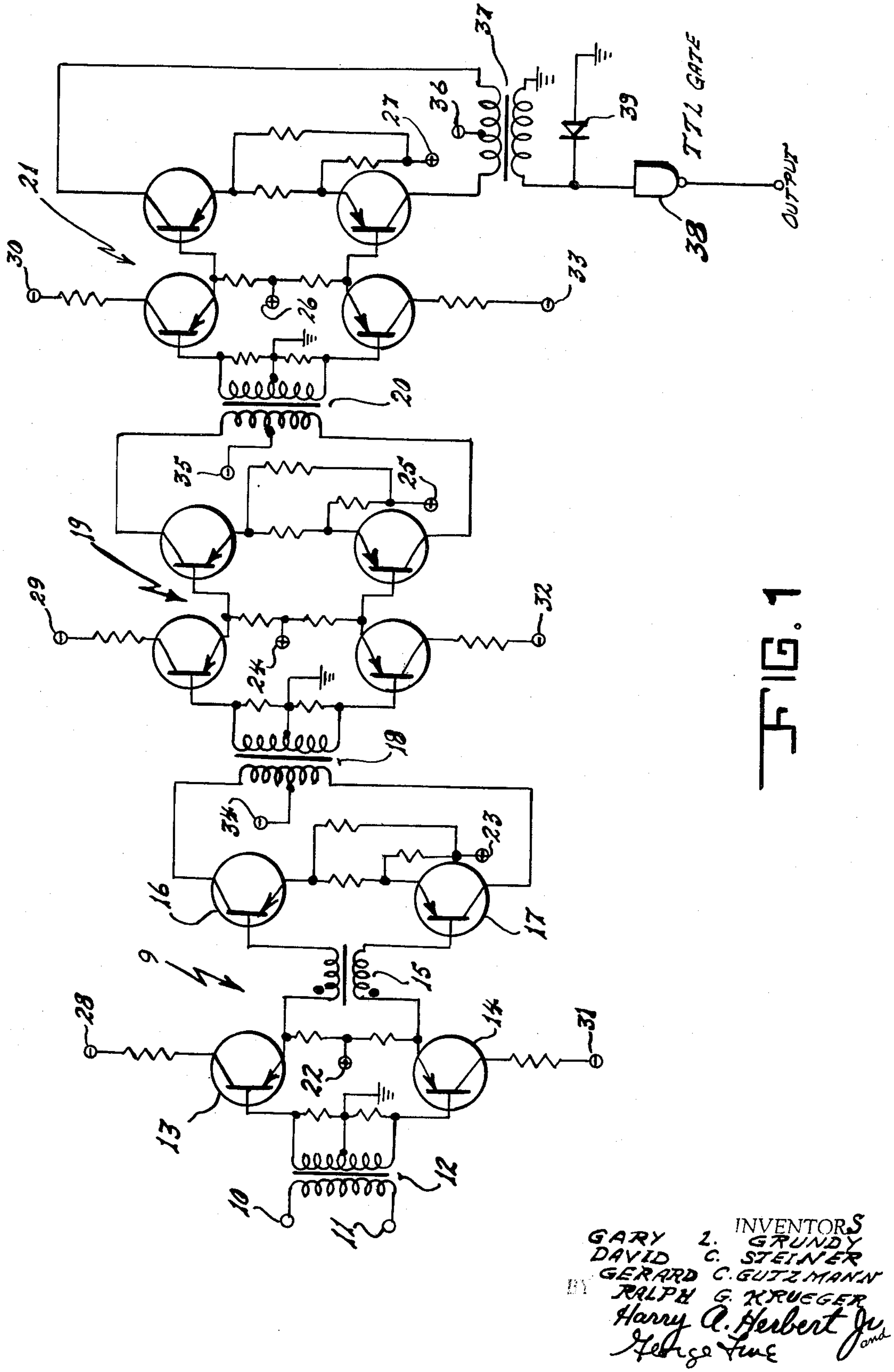
FIG. 1 is a schematic diagram of the radiation hardened sense amplifier in accordance with this invention.

The radiation hard sense amplifier is comprised of a three stage, AC coupled, differential amplifier. The input signal which is applied to the first stage 9 is coupled to the primary winding of transformer 12 at terminals 10, 11. The output signal of transformer 12 is then applied to the bases of transistors 13, 14. The signals appearing at the emitters of transistors 13, 14 are coupled via the common mode choke 15 to the bases of transistors 16, 17. The outputs of transistors 16, 17 are coupled to opposite ends of the primary winding of transformer 18. Transformer 18 which couples the first stage 9 of the sense amplifier to the second stage 19 provides a photocurrent cancellation of the transient effects which may be induced by gamma radiation. Transformer 20 performs a similar function and couples the second stage 19 of the sense amplifier to the third stage 21. The three stages 9, 19, 21 of the sense amplifier are basically identical with the exception of the first stage 9 which has the common mode choke 15 inserted between the emitter to base connection of the transistors in the Darlington pairs. Any conventional power supply means (not shown) may be utilized to supply the positive and negative voltages which are respectively required for circuit operation by positive terminals 22–27 and by negative terminals 28–36. The output of the third stage 21 is coupled to transistor-transistor logic gate 38 by transformer 37. A diode 39 is provided to allow only substantially positive signals to enter TTL gate 38.

The photocurrent cancelling techniques which are required to overcome the transient effects of gamma radiation are employed by transformer coupling each stage and by using a common mode choke 15 in the first stage 9 where the signal-to-noise ratio is most critical. The gain stabilization is provided by the dual transistor in each stage and the gain per stage is approximated by the ratio of reflected collector impedance to the emitter feedback resistance. The TTL gate 38 output is a radiation hard circuit and is used to threshold the sense amplifier output signal. The threshold level may be adjusted by changing the value of the gate terminating resistor (not shown).

In any sense amplifier design, the signal-to-noise ratio is of paramount importance. The signal must be faithfully amplified without degradation from the effects of radiation induced photocurrents. By employing transformers to AC couple differential stages of the sense amplifier, the photocurrents therein induced by gamma radiation may be cancelled. The output of each half of the differential stage is wound on a common core. The phase of the two windings are in opposition, thus canceling any photocurrent common to both halves of the differential stage. The amplification and the stage to stage propagation of the photocurrents are also reduced. The other advantages of transformer coupling are stage to stage impedance matching and the effects of long term transients (3 to 4 times longer than the memory element signal) and input offsets may be reduced by dropping transformers. Transformers are not vulnerable to radiation and are used to replace any vulnerable components (semiconductors).

The signal-to-noise is most critical in the first stage of the amplifier while the following stages have the benefit of signal amplification and higher signal-to-noise ratios. By using a Darlington, an unfavorable signal-to-noise ratio is realized. With the insertion of the common mode choke 15, the unfavorable signal-to-noise characteristics of the Darlington are overcome. The Darlington configuration is necessary to stabilize amplifier gain in a neutron environment. The signal-to-noise ratio for the Darlington configuration is decreased approximately by a factor of $\beta$ (gain of the first transistor in the Darlington pair) as compared to the single transistor differential pair. The insertion of a common mode choke 15 in the emitter to base lead of the transistor in the first stage 9 of the sense amplifier, produces a substantial increase in the signal-to-noise ratio for the stage. The imbalance of photocurrents which are induced by gamma radiation in the first stage 9 are canceled in the common mode choke 15.

A constant amplifier gain is required for maintaining a stable signal threshold. Since transistor gains change radically when bombarded with neutrons, a high degree of feedback is used to stabilize the sense amplifier gain. Gain changes of an order of magnitude are not uncommon. In order to insure a constant gain during pre and post radiation conditions, a Darlington type configuration with heavy feedbacks is used in place of a conventional differential pair. A high gain Darlington configuration with feedback during a radiation condition will substantially maintain its pre-radiation gain level. The increase in gain of the single transistor during a radiation condition as compared with the preradiation condition is in the area of 31 percent while the Darlington configuration gain change is only 4 percent.

A change in gain of the sense amplifier will have a significant effect on storage. The use of antisaturation techniques and transistor off drive will alleviate some of the storage difficulties. Gamma radiation will also induce timing jitter of a transient nature. These timing changes propose a signal strobing problem. Two basic methods of strobing are considered; signal sampling (strobe is narrower than signal) and enveloping the signal with strobe. The unfavorable property of signal sampling is the critical strobe timing since the strobe must hit directly on the signal preferably centered about the peak of the signature. This critical timing is very difficult to achieve in a radiation environment where timing is changing because of storage changes and transient responses. Integration of the signal to obtain a wider signal and thus decrease critical timing requirements would decrease an already unfavorable signal to radiation induced noise ratio since the signal flux is constant and integration would decrease signal amplitude. By enveloping the signal with a strobe, the timing changes inherent in a radiation environment can be tolerated.

It may be noted that due to small number of different individual components, the present sense amplifier may be manufactured utilizing integrated circuit techniques. When the differential stages are integrated, the transistors can be more closely matched since the semiconductors involved will be made at the same time on the same substrate. By utilizing the design concepts demonstrated in conjunction with the increased differential balance, a sense amplifier which has a high radiation tolerance, may be anticipated.

The sense amplifier was operated in a high level gamma radiation environment, with various input signals applied. The effects of the gamma radiation upon the output signal was observed and the results are shown in FIGS. 2A–2F.

The TTL gate 38 output is shown in FIGS. 2A–2D for +10 mv and −10mv input signals. No output should be apparent from the −10mv input signal since the gate is set in only the positive direction. In FIG. 2D, with no input signal, the radiation noise was injected into the output. In FIGS. 2E and 2F, the TTL gate 38 output for a 6 mv input signal which is the threshold level of the gate is shown.

Although the invention has been described with reference to a particular embodiment, it will be understood to those skilled in the art that the invention is capable of a variety of alternative embodiments within the spirit and scope of the appended claims.

We claim:

1. A radiation hardened sense apparatus for operation in radiation environments comprising in combination a differential amplifier including two halves and having an input terminal pair and output terminal pair for each half of the differential amplifier, said input terminal pair being connected to an A-C input transformer, said output terminal pair being connected to an A-C output transformer, the primary and the secondary windings of said A-C output transformer being wound on a common core, said primary and secondary windings of each half of said output transformer being in opposite phase to each other for cancelling any photocurrents common to both halves of the differential stage.

2. A radiation hardened sense amplifier according to claim 1 wherein said differential amplifier comprises a Darlington pair.

3. A radiation hardened sense amplifier according to claim 2 wherein said differential amplifier comprises a three stage differential amplifier having a first, a second and a third stage.

4. A radiation hardened sense amplifier according to claim 3 wherein said first stage of said differential amplifier further includes a common mode choke connected between said Darlington pair.

5. A radiation hardened sense amplifier according to claim 4 further including a radiation hardened transistor-transistor logic gate connected to the output of said third differential amplifier stage.

* * * * *